United States Patent [19]

Fujii et al.

[11] Patent Number: 4,824,743

[45] Date of Patent: Apr. 25, 1989

[54] SECONDARY BATTERY WITH ION-EXCHANGE POROUS MEMBRANE

[75] Inventors: Toshinobu Fujii, Hino; Yasuo Ando, Mitaka; Kazuo Fushimi, Kawaguchi, all of Japan

[73] Assignee: Kabushiki Kaisha Meidensha, Tokyo, Japan

[21] Appl. No.: 922,709

[22] Filed: Oct. 24, 1986

[30] Foreign Application Priority Data

Oct. 30, 1985 [JP] Japan .................................. 60-241606
Oct. 31, 1985 [JP] Japan ........................... 60-166711[U]

[51] Int. Cl.$^4$ .......................................... H01M 2/14
[52] U.S. Cl. .................................... 429/101; 429/249
[58] Field of Search ............... 429/101, 105, 249; 204/296; 521/25, 27, 33

[56] References Cited

U.S. PATENT DOCUMENTS

| | | | |
|---|---|---|---|
| 2,636,851 | 4/1953 | Juda et al. | 204/98 |
| 2,913,511 | 11/1959 | Grubb, Jr. | 429/30 |
| 4,135,996 | 1/1979 | Bouy et al. | 204/98 |
| 4,418,128 | 11/1983 | Fujii | 429/105 X |
| 4,510,218 | 4/1985 | Ando et al. | 429/101 X |

Primary Examiner—Anthony Skapars
Attorney, Agent, or Firm—Bachman & LaPointe

[57] ABSTRACT

An ion-exchange porous, secondary battery separation membrane produced by mixing a high molecular compound matrix material, an ion exchange material, and a pore forming material, kneading the materials, forming the kneaded materials in the form of a membrane, and extracting the pore forming material from the membrane.

6 Claims, 1 Drawing Sheet

SECONDARY BATTERY WITH ION-EXCHANGE POROUS MEMBRANE

BACKGROUND OF THE INVENTION

This invention relates to a secondary battery having a stack of secondary cells each comprising an ion-exchange porous separation membrane.

Porous membranes have been used widely for various purposes in chemical, electrochemical and brewing industries. The thickness, porosity, and pore size of such porous membranes are determined for each purpose. Ion-exchange porous membranes having porous and ion-exchange properties have also been proposed for applications particularly in electrochemical devices. It is the current practice to produce such an ion-exchange porous membrane by applying a physical or chemical process to line or coat an ion exchange material on one or both of the surfaces of a porous membrane. However, a number of problems occur in such prior art multi-layer type ion-exchange porous membranes. First of all, the multi-layer type ion-exchange porous membranes have a relatively great thickness and thus a relatively great electric resistance. Since ion exchange films inherently exhibit a great resistance to ionic migration unlike porous films, it is very difficult, if not impossible, to produce ion-exchange porous membranes having a small electric resistance through such a physical or chemical process lining or coating an ion exchange material on one or both of the surfaces of a porous membrane. In addition, ion exchange films, which are very expensive, have not be used widely in spite of the fact that they have useful functions.

SUMMARY OF THE INVENTION

A secondary battery having a stack of secondary cells each comprising a separation membrane produced by mixing a high molecular compound matrix material, an ion exchange material, and a pore forming material, kneading the resulting mixture, extruding or rolling the kneaded mixture in the form of a membrane, and extracting the pore forming material from the membrane.

The high molecular compound matrix material normally comprises polyolefin resin, polyamide resin, polyimide resin, or the like. It is preferable in view of cost and access considerations that the matrix material comprises polyethylene included in polyolefin resin. Such a matrix material permits production of an ion-exchange porous membrane having a high chemical resistance sufficient for use particularly in zinc-bromine secondary batteries.

The ion-exchange material may comprise a copolymer of styrene and divinylbenzene, an ion exchange resin including a matrix material of polyvinylalcohol or the like. The preferred range of the ion-exchange material for 100 parts by weight of the high molecular compound matrix material is from about 10 to about 110 parts by weight. If the ion-exchange material is less than the range, the resulting ion-exchange porous membrane exhibits an insufficient ion-exchange property. If it is greater than the range, the resulting ion-exchange porous membrane exhibits a poor physical strength. The ion exchange material comprises a positive or negative ion exchange radical selected from the group consisting of $-SO_3^-$, $-COO^-$, $-N^+(CH_3)_3$, and $-N^+H_3$.

The pore forming material, which serves to provide porosity to the high molecular compound matrix material, may include a lipophilic or hydrophilic material. The lipohilic pore forming material includes petroleum oil and dioctyl phthalate. The hydrophilic pore forming material includes polyvinyl alcohol, potassium chloride and sodium chloride. The preferred range of the pore forming material for 100 parts by weight of the high molecular compound matrix material is from 20 to 140 parts by weight. If the pore forming material is less than the range, the resulting ion-exchange porous membrane exhibits poor porosity insufficient for uniform wetting of the membrane and also for good ion transfer through the membrane. If it is greater than the range, the resulting ion-exchange porous membrane exhibits poor physical strength. The physical strength of the ion-exchange porous membrane is extremely poor if the pore forming material is greater than 150 parts by weight. According to the invention, ion-exchange porous membranes having desired properties can be produced through a relatively simple process.

DESCRIPTION OF THE PREFERRED EMBODIMENTS

Figure 1:
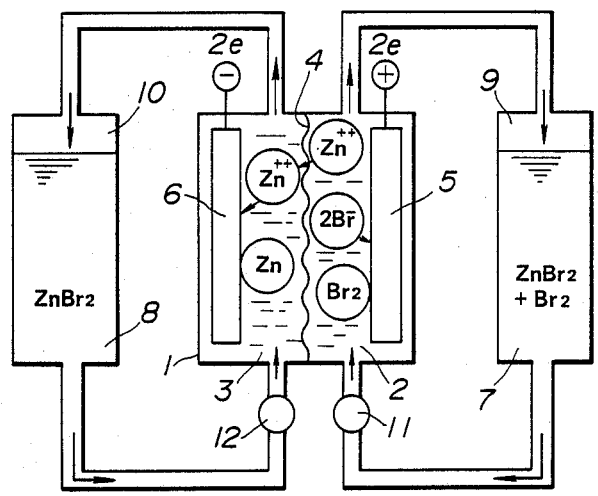
FIG. 1 is a schematic view of a zinc-bromine secondary battery having an ion-exchange porous membrane of the invention.

The following Examples further specifically define the surprisingly advantageous ion-exchange porous membrane of this invention. The parts are by weight unless otherwise indicated.

The Examples below are intended to illustrate various preferred embodiments of the improved ion-exchange porous membrane of this invention.

EXAMPLE 1

About 50 parts by weight of cation exchange resin powder is mixed with about 100 parts by weight of polyethylene until a uniform mixture is prepared. The polyethylene powder has a density of 0.96 g/cm$^3$ and an MFR (molting flow rate) of 0.80 g/10 min. The cation exchange resin powder is available from Nichibi Co. and has an average length of 50 micrometers, an average long diameter of 30 micrometers, an average short diameter of 10 micrometers, and a cation-exchange capacity of 3.9 meq/g. The mixture is then placed in a Banbury mixer and about 100 parts by weight of dioctyl phthalate is added. The materials are mixed by rotating the Banbury mixer. The mixture is then placed in a calender rolling machine. The mixture is rolled in the form of a membrane having a uniform thickness of about 1 mm by operating the calender rolling machine. Trichloroethylene is applied to extract the dioctyl phthalane from the rolled membrane. The resulting cation-exchange porous membrane has a specific surface area of about 300 cm$^2$/g and an cation exchange capacity of about 0.9 meq/g.

EXAMPLE 2

About 100 parts by weight of cation exchange resin powder is mixed with about 100 parts by weight of polyethylene until a uniform mixture is prepared. The polyethylene powder has a density of 0.96 g/cm$^3$ and an MFR (molting flow rate) of 0.80 g/10 min. The cation exchange resin powder is avaialbe from Nichibi Co. and has an average length of 50 micrometers, an average long diameter of 30 micrometers, an average short diameter of 10 micrometers, and an ion-exchange capacity of 3.9 meq/g. The mixture is then placed in a Banbury mixer and about 100 parts by weight of dioctyl phthalate is added. The materials are mixed by rotating the Banbury mixer. The mixture is then placed in a calender rolling machine. The mixture is rolled in the form of a membrane having a uniform thickness of about 1 mm by operating the calender rolling machine. Trichloroethylene is applied to extract the dioctyl phthalane from the rolled membrane. The resulting cation-exchange porous membrane has a specific surface area of about 470 cm$^2$/g and an cation exchange capacity of aobut 1.4 meg/g.

One embodiment of a typical application of the invention will be described with reference to FIG. 1 which is a schematic view of an electrolyte circulation type secondary battery.

A secondary cell, generally designated by the numberal 1, includes positive and negative electrode chambers 2 and 3 divided by a separation membrane 4 which provides an electrochemical separation between the positive and negative electrode chambers. An positive electrode 5 is place in the positive electrode chamber 2. A negative electrode 6 is placed in the negative electrode chamber 3. The positive and negative electrodes are electrically connected respectively to positive and negative terminals for connection to a DC power source and an electrical load through a suitable changeover switch. The positive electrode chamber 2 has inlet and outlet ports connected with each other through a circulation line having therein an positive electrolyte storage tank 9 filled with a positive electrolyte 7 such for example as $ZnBr_2+Br_2$. An electric pump is provided in the positive electrolyte circulation line. The electric pump 11 is operable to circulate the positive electrolyte 7 from the positive electrolyte storage tank 9 into the positive electrode chamber 2 and from the positive electrode chamber 2 into the positive electrolyte storage tank 9. Similarly, the negative electrode chamber 3 has inlet and outlet ports connected through another circulation line having therein a negative electrolyte storage tank 10 filled with a negative electrolyte 8 such for example as $ZnBr_2$. An electric pump 12 is provided in the negative electrolyte circulation line. The electric pump 12 is operable to circulate the negative electrolyte 8 from the negative electrolyte storage tank 10 into the negative electrode chamber and from the negative electrode chamber 3 into the negative electrolyte storage tank 10.

To charge the secondary battery with electrical energy, a DC electrical power source may be connected across the positive and negative terminals of the secondary cell 1 with the electric pumps 11 and 12 being driven to circulate the positive and negative electrolytes 7 and 8 through the positive and negative electrode chambers 2 and 3 in the directions, as indicated by the arrows of FIG. 1, respectively. During the charging mode, an oxidation reaction is carried out, as $2Br^-\rightarrow Br_2+2e^-$, on the positive electrode 5 and a reduction reaction is carried out, as $Zn^{++}+2e^-\rightarrow Zn$, on the negative electrode 6. The resulting bromine molecules are mixed with the positive electrolyte 7. A small percentage of the bromine molecules is dissolved in the positive electrolyte 7 and a great percentage of the bromine molecules reacts with a complexing agent to produce a bromine complex in the positive electrolyte 7. The resulting bromine complex is precipitated. The precipitated bromine complex flows into the electrolyte storage tank 9 along with the circulating electrolyte and it is collected on the bottom thereof. This is described in greater detail in U.S. Pat. No. 804,433 filed on Dec. 14, 1985, to which the present invention is also applicable. The resulting zinc is electrodeposited and electroplated on the negative electrode 8.

To discharge electrical power from the secondary battery to an electric load, the electric load may be connected across the positive and negative terminals of the secondary cell 1 with the electric pumps 11 and 12 being driven to circulate the positive and negative electrolytes 7 and 8 through the positive and negative electrode chambers 2 and 3. During the discharging mode, electrochemical reactions are carried out respectively on the positive and negative electrodes 5 and 6 in the directions consuming the electrodeposited materials Zn and Br$_2$, these directions being opposite to those described in connection with the charging mode. That is, a reduction reaction is carried out, as $Br_2+2e^-\rightarrow 2Br^-$, on the positive electrode 5 and an oxidation reaction is carried out, as $Zn\rightarrow Zn^{++}+2e^-$, on the negative electrode 6.

The separation membrane 4 is provided for the purpose of preventing transfer of the bromine molecules produced on the positive electrode to the negative electrode, causing self-discharge in a charge mode. The ammonium salt complexing agent is added to convert the produced bromine molecules into oily bromine complex. It is expected by the addition of the bromine comlexing agent to suppress self-discharge, relieve the strong corrosion property of the bromine molecules, and thus increase the freedom of choice of the material of the separation membrane.

Figure 2:
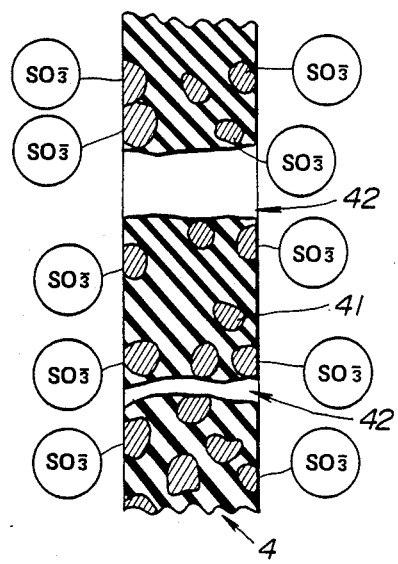
FIG. 2 is a fragmentary sectional view of the on-exchange porous membrane.

The separation membrane 4 is taken in the form of the ion-exchange porous membrane of the invention which has a structure as shown in FIG. 2 where the numeral 41 designates ion exchange particles and the numeral 42 designates pores. Assuming now that the ion-exchange porous membrane is of the cation exchange type, $SO_3^-$ repels bromine molecules existing mainly in the form of $Br_3^-$ in the electrolyte to prevent diffusion of the bromine molecules toward the negative electrode. The complexing agent $(Q^+Br^-)$ exists in the form of $Q^+$ in the electrolyte and couples with $SO_3^-$ into $SO_3^-Q^+$ which adheres on the membrane. With a conventional ion exchange membrane provided with physical pores having a pore size in the order of 100 nm (100 Å), the pores get clogged by $Q^+$, causing an increase in the electric resistance of the separation membrane. With a conventional porous membrane provided with physical pores having a pore size ranging from several nanometers to several micrometers which allows residual bromine molecules to transfer through the pores to the negative electrode, causing self-discharge in a charge mode. The ion-exchange porous membrane of the invention is free from this difficulties.

A test was performed for electric resistance on an ion-exchange porous membrane made in accordance with the invention. A 3 mol/l zinc bromide aqueous solution was prepared for an electrolyte. A 1 mol/l complexing agent was added to the electrolyte. The ion-exchange porous membrane was dipped in the electrolyte. The membrane electric resistance was measured. Similar tests were performed on a polyethylene porous membrane and a cation exchange membrane available as 423 (a trademark of DuPont). The test results were as follows. The cation-exchange porous membrane (1.0 mm in thickness) exhibited a 6.5 Ω.cm$^2$ electric resistance, the porous membrane (1.2 mm in thickness) exhibited a 5.6 $\Omega.cm^2$ electric resistance, and the cation exchange membrane exhibited a 39.6 $\Omega.cm^2$ electric resistance.

Tests were performed for battery energy efficiency on a secondary battery with an cation-exchange porous separation membrane and a secondary battery with a polyethylene porous separation membrane. The electrolyte was a 3 mol/l zinc bromide aqueous solution to which a 1 mol/l complexing agent was added. The test results were as follows. The secondary battery with the cation-exchange porous separation membrane exhibited a 76.0% residual electrical energy after it was left in 14 days and a 74.7% residual electrical power after it was left in 28 days. The secondary battery with the conventional porous separation membrane exhibited a 71.2% residual electrical power after it was left in 14 days and a 69.5% residual electrical power after it was left in 28 days. It is apparent from the test results that cation-exchange porous separation membranes provide an energy efficiency much greater than conventional porous separation membranes.

Although a zinc-bromine secondary battery has been shown and described, it is to be noted that the secondary battery may be a zinc-halogen secondary battery, the halogen being selected from the group consisting of chlorine, bromine, and iodine.

It will be understood that various other changes in the details and materials which have been herein described in order to explain the nature of this invention will occur to and may be made by those skilled in the art upon a reading of this disclosure and such changes are intended to be included within the scope of this invention.

What is claimed is:

1. A secondary battery having a stack of secondary cells each comprising:
   a positive electrode chamber;
   a negative electrode chamber; and
   a separation membrane separating said positive and negative electrode chambers from each other, said separation membrane being produced by mixing a high molecular compound matrix material, an ion exchange material, and a pore forming material, kneading the materials, forming the kneaded materials in the form of a membrane, and extracting the pore forming material from the membrane, said separation membrane being an ion-exchange porous membrane having a single layer structure including ion-exchange particles dispersed in the high molecular compound matrix material and a number of fine pores extending through the high molecular compound matrix material.

2. The secondary battery separation membrane as claimed in claim 1, wherein the matrix material is 100 parts by weight and the ion exchange material is in the range from 10 to 100 parts by weight.

3. The secondary battery separation membrane as claimed in claim 1, wherein the ion exchange material comprises a positive ion exchange radical.

4. The secondary battery separation membrane as claimed in claim 3, wherein the positive ion exchange radical is selected from the group consisting of $-SO_3^-$ and $-COO^-$.

5. The secondary battery separation membrane as claimed in claim 3, wherein the matrix material is selected from the group consisting of polyolefin resin, polyamide resin, polyimide resin, and polyethylene.

6. A secondary battery having a stack of secondary cells each comprising:
   a positive electrode chamber;
   a negative electrode chamber; and
   a separation membrane separating said positive and negative electrode chambers from each other, said separtion membrane produced by mixing about 100 parts by weight of high molecular compound material, from about 10 to about 110 parts by weight ion exchange material, and from about 20 to about 140 parts by weight pore forming material, kneading the materials, forming the kneaded materials into the form of a membrane, and extracting the pore forming material from the membrane.

* * * * *